Patented Dec. 26, 1939

2,184,775

UNITED STATES PATENT OFFICE 2,184,775

METHOD OF PRODUCING HORMONE PREPARATIONS OF HIGH PURITY

Erwin Schwenk, Bloomfield, N. J., Friedrich Hildebrandt, Hohen Neuendorf, near Berlin, and Max Gehrke, Birkenwerder, near Berlin, Germany, assignors to Schering Corporation, Bloomfield, N. J., a corporation of New Jersey No Drawing. Application February 7, 1935, Serial No. 5,400. In Germany February 9, 1934

10 Claims. (Cl. 260—397)

This invention relates to the production of hormone preparations and more especially to the manufacture of pure hormones of the germinal glands, the present application being a continuation-in-part of our copending application Serial No. 723,928, filed May 4, 1934, and which has issued as Patent No. 2,106,763.

In copending application Serial No. 637,202, filed October 10, 1932, a process for the preparation and purification of pure germinal gland hormones is described which is characterized by the feature that a crude material containing a germinal gland hormone is reacted with a compound of the benzene series capable of condensing with said hormone to form an alkali-soluble ester and having the general formula: X—R—Y, wherein R is a benzene residue, Y is a group which is capable of condensing to form esters with hormones containing alcoholic hydroxyl groups and may be selected from a class consisting of the groups —COCl, —CO.O.CO— and —COOH, while X is a salt-forming group; that is, a group serving to make the said ester alkali-soluble; or a group capable of conversion into such a group, such as —COOH, —SO$_3$H, —OH and —NH$_2$; said reaction being followed by separation of the resulting alkali-soluble ester, usually by extraction with dilute alkali, saponification and recovery of the purified hormone. By this method, for instance, by fusing of a crude hormone extract with phthalic acid anhydride, the male germinal gland hormone and the female hormone trihydroxy oestrin can each be separated quite readily from its accompanying substances. Instead of phthalic acid anhydride other compounds of similar properties have proved to be suitable for carrying out this process, such as the chlorides of hydroxy carboxylic acids of the aromatic series, for instance, salicylic acid chloride and the like, or phenyl hydrazine sulfonic acids which form condensation products with the keto group present, for instance, in the follicle hormone and the male sex hormone, and the like reagents.

We have found that the most suitable condensing agents for this process are the sulfo carboxylic acids of the general formula:

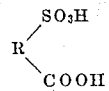

wherein R represents any substituted or not-substituted aliphatic or aromatic radical. Such compounds are, for instance, sulfo acetic acid, sulfo phthalic acid, sulfo phenyl acetic acid, sulfo toluylic acid, sulfo benzoic acids and the like. The most suitable compound proved to be m-sulfo benzoic acid, but the other acids may also be used although more by-products which can be saponified only with difficulty are formed with these acids than with said m-sulfo benzoic acid.

In order to carry out the process of this invention said sulfo carboxylic acid is preferably reacted in the form of its chloride with the crude hormone preparation to be purified, in the presence of a tertiary amine, such as pyridine, quinoline, dimethyl aniline and the like; thereupon, the sulfo carboxylic acid ester formed, having the general formula:

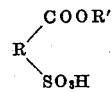

wherein R' is the hormone radical, is precipitated in the form of its salt with the tertiary amine by the addition of an organic solvent immiscible with water, such as benzene, benzine, ether and the like. When using acetic acid sulfo chloride, the pyridinium salts of the ester acids have to be precipitated by means of petroleum ether instead of with ether, for they are somewhat soluble in the latter. Thereby the not-esterified components of the crude hormone preparation remain in solution in said solvent and can be obtained therefrom.

The process described has a number of advantages over the known processes. Thus, it exhibits the known advantages of the esterification with acid chlorides in the presence of a tertiary amine, said advantages consisting in the rapid, practically quantitative reaction without splitting off of water. A further essential advantage consists in the formation of carboxylic acid esters which are capable of being readily saponified. On the other hand the presence of the sulfo group causes the formation of salts of the amines used, said salts being insoluble in organic solvents. That aqueous solutions are avoided on separating the esterified from the non-esterified compounds, is a further advantage which prevents the formation of soap emulsions and the reciprocative influence in solubility of soap and neutral components.

A further object of the present invention consists in combining the above described method or the method of the copending application Serial No. 637,202 with a method whereby a further subdivision of the esterified and the non-esterified fraction is achieved by treatment with aqueous alkaline solutions of various degrees of alkalinity in the presence of water-immiscible organic solvents. This combination process offers considerable technical advantages over the simple methods. For instance, by dividing crude extracts of the germinal gland hormone by fusing with phthalic acid anhydride into an acid ester fraction which is soluble in sodium carbonate solution, and into a neutral, ether-soluble fraction which contains the unesterified components as well as those which form neutral esters, saponifying these two fractions and extracting the alkaline saponification solution, for instance, subsequently with ether or other water-immiscible solvents in dilute alkali hydroxide, alkali bicarbonate and finally acid solution, a subdivision of the starting material into six fractions is achieved, each of said fractions containing compounds of similar chemical properties. The two fractions obtained by ether extraction of the alkaline saponification liquids can furthermore be subdivided into a phenolic and a neutral fraction by distribution between concentrated alkali and a water-immiscible organic solvent.

By this method of extensive subdivision of the crude hormone preparations the germinal gland hormones present therein are concentrated in the corresponding fractions in accordance with their peculiar and specific chemical properties and are separated from physiologically inactive accompanying substances as well as from chemically different hormones.

Thus, for instance, the male sex hormone due to its alcoholic nature is present in the neutral portions of the acid phthalic acid ester fraction while the follicle hormone is found together with the weak phenols of the so-called not-esterified fractions of the phthalic acid anhydride fused mass. The follicle hormone hydrate of the formula $C_{18}H_{24}O_3$ present in extracts of the urine of pregnant women is of a more strongly phenolic character than the follicle hormone and furthermore possesses two alcoholic hydroxy groups. Hence, it is found together with the strongly phenolic compounds of the acid phthalic acid ester fraction.

Thus, the process described exerts an extraordinarily selective effect and allows, besides separating the male sex hormone from the follicle hormone, also a separation of the various female sex hormones. A further advantage of this combination process consists in the fact that products of high purity are obtained thereby. Especially the female sex hormones can be obtained directly in a pure crystalline state. In contrast hereto, the hitherto known processes require a large number of extractions and crystallizations for obtaining pure products.

The following tables serve to illustrate the invention showing diagrammatically the various steps of the process claimed without, however, limiting the invention to the examples given in these tables.

Table I

Starting material: An extract of the urine of male individuals containing besides impurities, male sex hormones, i. e. keto alcohols of the formula $C_{19}H_{30}O_2$ and $C_{19}H_{28}O_2$, its activity corresponding to 5 mg. for the capon unit:

+m-benzoic acid sulfonic chloride and pyridine poured in ether

↙ ↘

Precipitate consisting of pyridine chlorohydrate, pyridonium salt of m-benzoic acid sulfonic acid and pyridonium salts of compounds of the formula

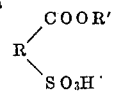

R′ representing among others the radical of the male sex hormone.
Saponified by KOH.

↓

Saponification solution extracted with ether.

↙ ↘

Alkaline solution containing acids and strong phenolic compounds.

Ethereal solution containing impurities only, such as hydrocarbons, ketones and the like.

Ethereal solution containing the male sex hormones, other alcoholic and weak phenolic compounds.
Extracted with concentrated NaOH

↙ ↓

Alkaline solution containing weak phenolic compounds.

Ethereal solution containing alcoholic compounds only, such as the male sex hormone.

Evaporated

↓

Purified oily male sex hormones, their activity corresponding to 2 mg. for the capon unit.

Table II

Starting material: Crude follicle hormone oil obtained from the urine of pregnant mares having an activity of about 300,000 mice units for the gram, containing, for instance, follicle hormones $C_{18}H_{22}O_2$, $C_{18}H_{20}O_2$ and $C_{18}H_{18}O_2$ and other accompanying substances.

Fused with phthalic acid anhydride.
Fused mass poured in water.

↓

Aqueous suspension to which solid sodium carbonate is added. Then mixed with ether and thoroughly shaken

↙ ↘

Sodium carbonate solution to which solid alkali hydroxide is added; saponified.

Ethereal solution. Evaporated and saponified.

↓ ↓

Alkaline saponification liquid diluted with water and thoroughly extracted with ether.

Alkaline saponification liquid diluted with water and thoroughly extracted with ether.

↙ ↘ ↙ ↘

| Dilute alkaline solution containing acid and more strongly phenolic components. | Ethereal solution containing the so-called δ-follicle hormone in a highly purified state. | Dilute alkaline solution containing phthalic acid and more strongly acid phenols than the follicle hormones. | Ethereal solution containing a follicle hormone product having an activity of about 4 to 6 million mice units for the gram. |

Table III

Starting material: Crude follicle hormone oil obtained from the urine of pregnant women having an activity of about 100,000 mice units for the gram, containing, for instance, the follicle hormones $C_{18}H_{22}O_2$, follicle hormone hydrate $C_{18}H_{24}O_3$, the male sex hormones $C_{19}H_{30}O_2$, pregnandiol and allo-pregnandiol and other accompanying substances.

Fused with phthalic acid anhydride.
Fused mass poured in water.
↓
Aqueous suspension to which solid sodium carbonate is added then mixed with ether and thoroughly shaken.
↙ ↘

Sodium carbonate solution, to which solid alkalihydroxide is added; saponified.
↓
Alkaline saponification liquid saturated with carbondioxide.
↙ ↘

Sodium bicarbonate solution containing the acid components, mostly phthalic acid.

Ethereal solution extracted with concentrated alkali hydroxide solution.
↙ ↘

Alkaline solution containing the follicle hormone hydrate of 15,000 – 100,000 mice units for the gram.

Ethereal solution concentrated by evaporation (fractional crystallization).

Ethereal solution. Evaporated and saponified.
↓
Alkaline saponification liquid saturated with carbondioxide and extracted with ether.
↙ ↘

Sodium bicarbonate solution containing the acid components, mostly phthalic acid.

Ethereal solution extracted with concentrated alkali hydroxide solution.
↙ ↘

Alkaline solution containing the follicle hormone, having an activity of 1 to 3 million mice units for the gram.

Ethereal solution containing neutral accompanying substances.

↙ ↘

Mother liquor yielding the male sex hormone.

Crystallized product = pregnandiols.

A more detailed description of the invention is given in the following examples:

Example 1

10 grams of a crude oil obtained by extraction of the urine of male individuals, of which about 5 mg. correspond to one capon unit, are dissolved in 150 cc. of pyridine by heating on the water bath. To this solution 10 grams of m-benzoic acid sulfo chloride are added while stirring vigorously. After 10 minutes the solution obtained is cooled and poured in ether. The precipitate consisting of pyridine chlorohydrate and the pyridonium salts of the esterified and the unreacted sulfo carboxylic acid, is removed by centrifuging, washed in the centrifuge several times with ether, freed of the ether and dissolved in water. Thereupon, 100 cc. of concentrated potassium hydroxide solution are added and the mixture is heated on the water bath until the saponification is completed. The saponification liquid is then extracted with ether, the ethereal solution is freed from phenolic components by repeated extraction with concentrated sodium hydroxide solution and the remaining ethereal solution is washed repeatedly with water and concentrated.

The remaining residue represents a brownish viscous oil having a physiological activity of about 2 mg. for the capon unit. By this method it is possible to separate hydrocarbons and other compounds incapable of forming esters, such as ketones and the like, from the alcoholic or phenolic hormones.

The working-up of the sulfo carboxylic acid esters and their separation into the individual components may be carried out in any other suitable manner. The esters obtained may even be subjected to the action of phthalic acid anhydride according to the copending application Serial No. 637,202.

The esters may be saponified in any other manner, for instance, by means of sodium alcoholate or other alkaline agents.

Example 2

A crude hormone preparation obtained from the urine of pregnant mares by means of known methods and having an activity of about 300,000 mice units for the gram, is fused with an equal quantity of phthalic acid anhydride by heating for 6 hours to about 120–140° C. The mass is then diluted with the three- to fourfold quantity of ether and exhaustingly extracted by shaking with dilute 10% sodium carbonate solution. Thereby two fractions, an ethereal one and a sodium carbonate solution, are obtained.

The ethereal extract, after evaporating the ether, is saponified by means of 5% methanolic potassium hydroxide. After cooling, the methanolic saponification liquid is highly diluted by the addition of water so as to reduce the alkali concentration to 0.5%, which dilute alkaline solution is thoroughly extracted with ether. The ethereal extract obtained is then repeatedly extracted with 10–15% aqueous potassium hydroxide solution until no precipitation takes place on acidifying a sample of the last alkaline extract. Thereupon the combined alkaline extracts are acidified whereby the follicle hormone precipitates in a finely crystallized form. It can be isolated by filtration or by extraction with ether.

To the sodium carbonate extract obtained from the fused mass and containing the acid phthalic acid esters, solid potassium hydroxide is added until the solution contains 5% of the same, whereupon it is saponified by heating to 90–100° C. After cooling, the saponification liquid is highly diluted with water and thoroughly extracted with ether. Then, the ethereal extract is repeatedly extracted with 10 to 15% potassium hydroxide solution until the entire alkali-soluble material is removed from the ethereal solutions. On acidifying the combined alkaline extracts a resin is precipitated which is purified by taking it up in ether. It contains the δ-follicle hormone according to Schwenk and Hildebrandt in a highly purified state.

On using the urine of pregnant women or of male individuals, pregnandiol and the male sex hormones or the male sex hormones respectively are separated on account of their alcoholic nature from the phenolic portion by extracting the ethereal extract from the saponified phthalic acid ester fraction with concentrated alkali hydroxide solution.

By introducing carbonic acid into the dilute alkaline solutions remaining after the separation of the hormones which are extracted with ether further amounts of mostly crystalline products are precipitated and isolated by taking up in ether.

As starting materials there may be used other hormone extracts or preparations, such as those obtained from the urine of pregnant individuals, mares etc., placenta, ovaries and other organs, from vegetable material, such as palm oil and the like, extracts from coal, mineral oils and similar products and synthetic mixtures as they are obtained, for instance, on oxidation of sterines, and from various other sources, i. e. all mixtures which contain besides compounds of hormone character, physiologically inactive accompanying substances of a different chemical structure.

Of course, many variations and changes may be made by those skilled in the art in the details disclosed in the foregoing specification in accordance with the principles set forth herein and in the claims annexed hereto.

What we claim is:

1. A method for the production of hormone preparations of high purity comprising reacting a crude preparation containing germinal gland hormones of the cyclopentano polyhydro phenanthrene series containing at least one hydroxy group, with a compound containing one group capable of condensing with the hydroxy group of said hormone, and another group capable of forming salts, separating the reaction product into a salt-forming and a non-salt-forming fraction, saponifying said fractions and treating the saponification liquid with water-immiscible solvents, and adjusting the alkalinity of said saponification liquid in accordance with the chemical constitution of the hormones present in said fractions, so as to divide said fractions into further subfractions containing the individual hormones.

2. A method for the production of hormone preparations of high purity consisting in reacting a crude preparation containing germinal gland hormones with a compound capable of forming condensation products and having the general formula

wherein R is an aliphatic or aromatic radical, X is a member of the group consisting of —COOH, —COCl, —SO$_3$H, —NO$_2$, and phenolic —OH, and Y is a member of the group consisting of —COCl and —COOH, said groups including also the common anhydride group —OC.O.CO—, separating the reaction product into a salt-forming and a non-salt-forming fraction, saponifying said fractions and treating the saponification liquid with water-immiscible solvents, and adjusting the alkalinity of said saponification liquid in accordance with the chemical constitution of the hormones present in said fractions, so as to divide said fractions into further subfractions containing the individual hormones.

3. A method for the production of hormone preparations of high purity consisting in reacting a crude preparation containing germinal gland hormones with a carboxylic acid of the aromatic series, said acid containing, in addition to the carboxylic group, a further group capable of taking part in a condensation reaction, separating the reaction product into a salt-forming and a non-salt-forming fraction, saponifying said fractions and treating the saponification liquid with water-immiscible solvents, and adjusting the alkalinity of said saponification liquid in accordance with the chemical constitution of the hormones present in said fractions, so as to divide said fractions into further subfractions containing the individual hormones.

4. A method for the production of hormone preparations of high purity consisting in reacting a crude preparation containing germinal gland hormones with phthalic acid anhydride, separating the reaction product into a salt-forming and a non-salt-forming fraction, saponifying said fractions and treating the saponification liquid with water-miscible solvents, and adjusting the alkalinity of said saponification liquid in accordance with the chemical constitution of the hormones present in said fractions, so as to divide said fractions into further subfractions containing the individual hormones.

5. A method for the production of hormone preparations of high purity consisting in reacting a crude preparation containing germinal gland hormones with a sulfo carboxylic acid of the general formula

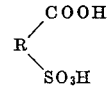

wherein R is an aliphatic or aromatic radical, said acid being capable of forming condensation products, separating the reaction product into a salt-forming and a non-salt-forming fraction, saponifying said fractions and treating the saponification liquid with water-immiscible solvents, and adjusting the alkalinity of said saponification liquid in accordance with the chemical constitution of the hormones present in said fractions, so as to divide said fractions into further subfractions containing the individual hormones.

6. A method for the purification of crude oily extracts obtained from the urine of mares in foal and containing among other compounds the follicle hormones $C_{18}H_{22}O_2$, $C_{18}H_{20}O_2$, and $C_{18}H_{18}O_2$ consisting in reacting said crude oil with a condensing agent capable of forming condensation products and also capable of forming salts, distributing the reaction product between a water-immiscible organic solvent and an alkali carbonate solution so as to separate the same into a salt-forming fraction dissolved in the alkali carbonate solution and a non-salt-forming fraction dissolved in said organic solvent, saponifying both fractions, extracting the water-diluted saponification liquid of the non-salt-forming fraction with an organic water-immiscible solvent, and isolating a crystalline follicle hormone preparation containing the compounds of the formulas $C_{18}H_{22}O_2$, $C_{18}H_{20}O_2$ and $C_{18}H_{18}O_2$ from said extract, while the water-diluted saponification liquid of the salt-forming fraction is also extracted with an organic water-immiscible solvent, said extract yielding the δ-follicle hormone in a highly purified state.

7. A method for the purification of crude oily extracts obtained from the urine of mares in foal and containing among other compounds the follicle hormones $C_{18}H_{22}O_2$, $C_{18}H_{20}O_2$, $C_{18}H_{18}O_2$, consisting in reacting said crude oil with phthalic acid anhydride, distributing the reaction product between ether and an alkali carbonate solution so as to separate the same into a salt-forming fraction dissolved in the alkali carbonate solution and a non-salt-forming fraction dissolved in said organic solvent saponifying both fractions, extracting the water-diluted saponification liquid of the non-salt-forming fraction with ether, and isolating a crystalline follicle hormone preparation containing the compounds of the formulas $C_{18}H_{22}O_2$, $C_{18}H_{20}O_2$ and $C_{18}H_{18}O_2$ from said extract, while the water-diluted saponification liquid of the salt-forming fraction is also extracted with ether, said extract yielding the δ-follicle hormone in a highly purified state.

8. A method for separating germinal gland hormones from crude oily extracts obtained from the urine of pregnant women containing among other compounds the follicle hormones $C_{18}H_{22}O_2$, follicle hormone hydrate $C_{18}H_{24}O_3$, the male sex hormones, pregnandiol and allopregnandiol, consisting in reacting said crude oil with a condensing agent comprising a sulfo carboxylic acid of the general formula

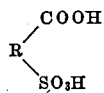

wherein R is an aliphatic or aromatic radical, distributing the reaction product between a water-immiscible organic solvent and an alkali carbonate solution so as to separate the same into a salt-forming fraction dissolved in the alkali carbonate solution, and a non-salt-forming fraction dissolved in said organic solvent, saponifying both fractions, extracting the water-diluted saponification liquid of the non-salt-forming fraction after saturation with carbon dioxide with an organic water-immiscible solvent, treating said extract obtained with concentrated alkali hydroxide solution and isolating from the alkaline solution obtained a crystalline follicle hormone preparation containing the follicle hormone $C_{18}H_{22}O_2$, while the water-diluted saponification solution of the salt-forming fraction, after saturation with carbon dioxide, is extracted with an organic water-immiscible solvent, whereupon the extract obtained is treated with concentrated alkali hydroxide solution whereby from the alkaline solution obtained the follicle hormone hydrate in a high state of purity is obtained while the remaining solution of the organic water-immiscible solvent is subjected to fractional crystallization, first yielding pregnandiol and allopregnandiol and on complete evaporation to dryness of the organic solvent the male sex hormone in a state of high purity.

9. A method for separating germinal gland hormones from crude oily extracts obtained from the urine of pregnant women containing among other compounds the follicle hormones $C_{18}H_{22}O_2$, follicle hormone hydrate $C_{18}H_{24}O_3$, the male sex hormones, pregnandiol and allopregnandiol, comprising reacting said crude oil with phthalic acid anhydride, distributing the reaction product between ether and an alkali carbonate solution so as to separate the same into a salt-forming fraction dissolved in the alkali carbonate solution, and a non-salt-forming fraction dissolved in said ether saponifying both fractions, extracting the water-diluted saponification liquid of the non-salt-forming fraction after saturation with carbon dioxide with ether treating said ethereal extract with concentrated alkali hydroxide solution and isolating from the alkaline solution obtained a crystalline follicle hormone preparation containing the follicle hormone $C_{18}H_{22}O_2$, while the water-diluted saponification solution of the salt-forming fraction, after saturation with carbon dioxide, is extracted with ether, whereupon the ethereal extract is treated with concentrated alkali hydroxide solution whereby from the alkaline solution obtained the follicle hormone hydrate in a high state of purity is obtained while the remaining ethereal solution is subjected to fractional crystallization, first yielding pregnandiol and allopregnandiol and on complete evaporation to dryness of the ether the male sex hormone in a state of high purity.

10. The product of the condensation of a germinal gland hormone of the cyclopentano phenanthrene series containing a hydroxyl group, and a sulfocarboxylic acid.

ERWIN SCHWENK.
FRIEDRICH HILDEBRANDT.
MAX GEHRKE.